Nov. 16, 1937.  N. B. HENRY  2,099,064
SEED COTTON CLEANER DRIER
Filed Oct. 14, 1936   2 Sheets—Sheet 1
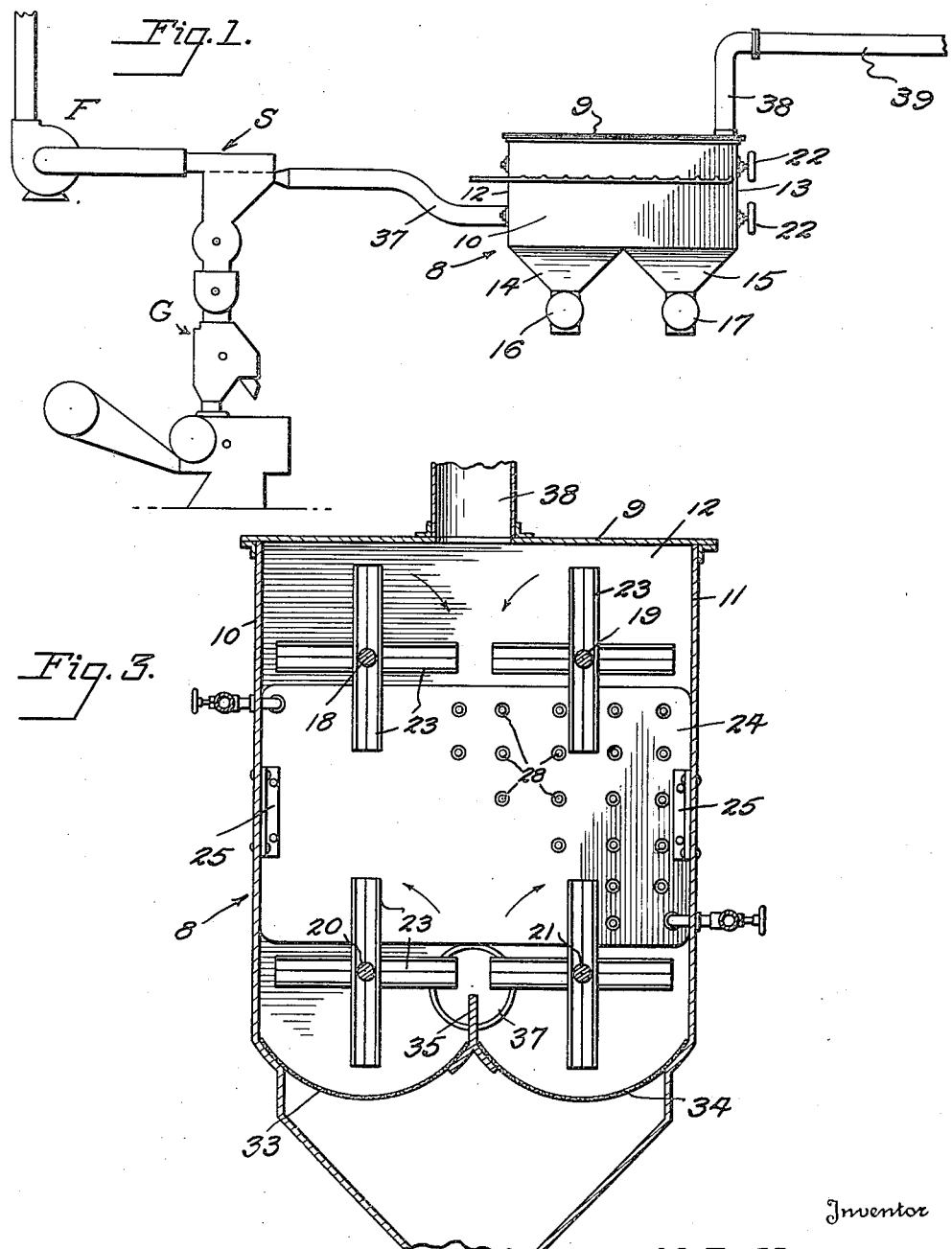

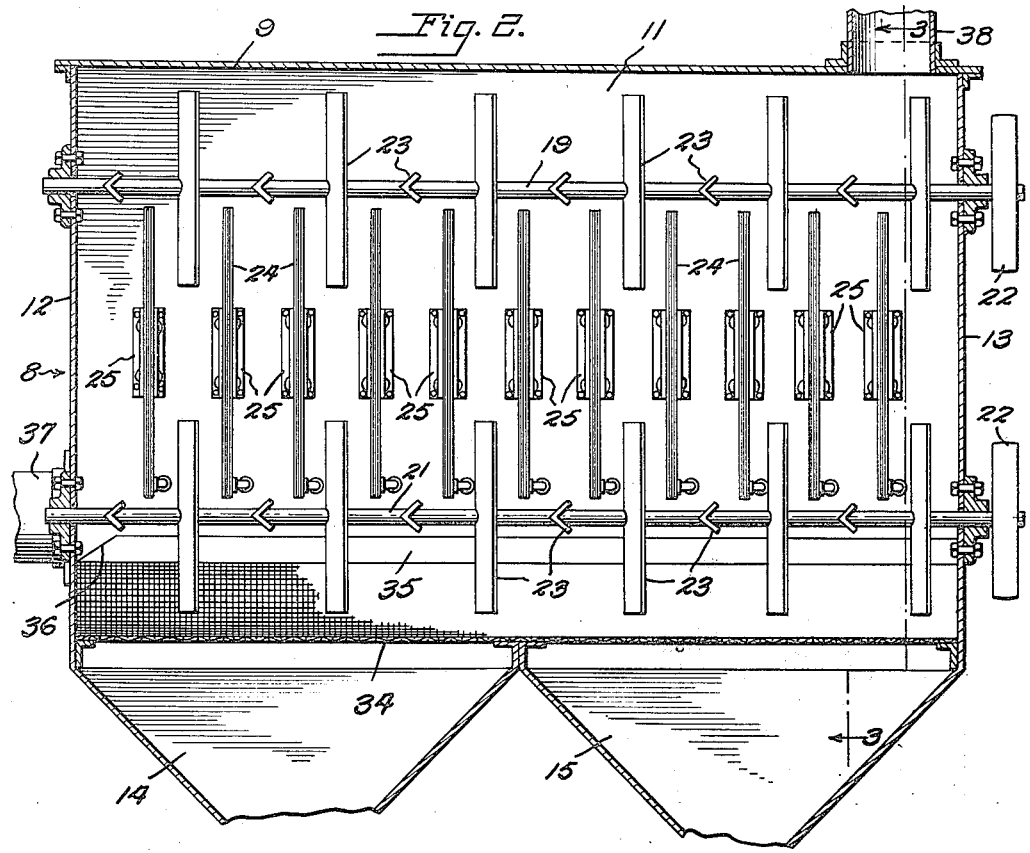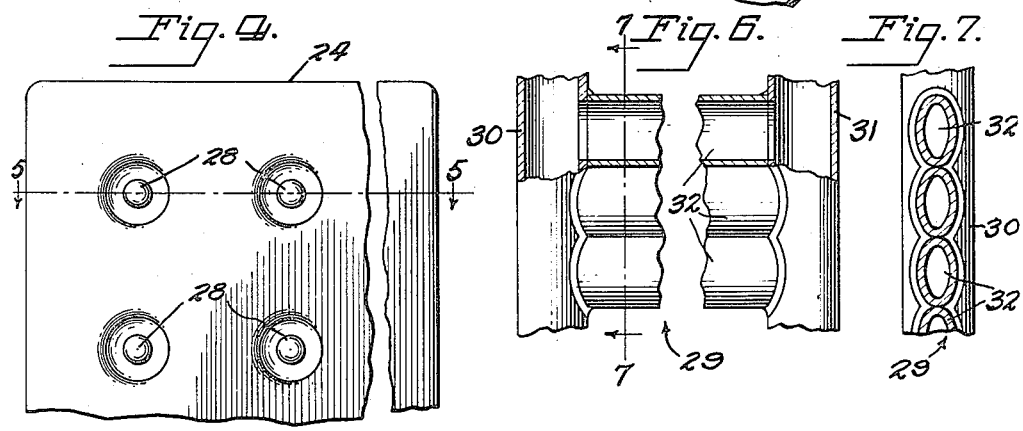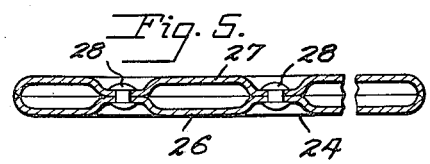

Patented Nov. 16, 1937

2,099,064

UNITED STATES PATENT OFFICE 2,099,064

SEED COTTON CLEANER-DRIER

Nelson B. Henry, Columbus, Ga.

Application October 14, 1936, Serial No. 105,625

8 Claims. (Cl. 19—93)

The invention forming the subject matter of this application is designed to dry and clean seed cotton during the feeding thereof from a source of supply to a separator connected to a gin battery.

The main object of the invention is to provide a combined cotton drier and cleaner in a single compact unit which can be applied as an attachment to any gin plant by means of a pipe commonly used for conducting air and cotton to the separator of the plant.

Another object of the invention is to provide a cleaner-drier which can be readily attached to the separator of a cotton gin plant to be operated by the suction fan that is regularly a part of the gin outfit, thereby eliminating extra fans commonly employed with cotton driers of the prior art, with a consequent saving of anywhere from fifteen to forty horse power.

Other objects of the invention will become apparent as the detailed description thereof proceeds.

In the drawings:

Figure 1 is a diagrammatic lay-out of the invention as applied to the separator of a cotton gin plant;

Figure 2 is a vertical section taken lengthwise through the combined cleaner and drier;

Figure 3 is a vertical transverse section taken on the line 3—3 of Figure 2;

Figure 4 is a side elevation of one of the heating elements of the cleaner-drier illustrated in Figure 2;

Figure 5 is a horizontal section taken on the line 5—5 of Figure 4;

Figure 6 is a fragmentary detail of another form of heater adapted for use in the cleaner-drier; and Figure 7 is a vertical transverse section taken on the line 7—7 of Figure 6.

Referring to the drawings, in which similar parts are designated by like numerals:

As shown in the drawings, the invention comprises a casing generally designated by the reference numeral 8. This casing comprises a substantially rectangular top 9, side walls 10 and 11, end walls 12 and 13, and a bottom formed by hoppers 14 and 15, which are closed by the conventional revolving air seal droppers 16 and 17, respectively. The end walls 12 and 13 are provided with bearings in which are journaled the shafts 18, 19, 20 and 21, the ends of which project through the wall 13 and are provided with suitable means, such as the pulleys 22 for effecting rotation of the shafts within the casing 8.

The shafts 18 and 19 are arranged parallel to each other in the upper part of the casing 8, and are rotated in opposite directions, as shown in Figure 3 of the drawings. The shafts 20 and 21 are arranged parallel to each other and to the shafts 18 and 19 in the lower part of the casing 8. These shafts 20 and 21 rotate in opposite direction to each other and to the shafts 18 and 19 located directly above them. All of the shafts are provided with angle iron beater bars suitably secured to the shafts, as shown in Figure 2 of the drawings.

The beater bars 23 are similarly arranged and equi-distantly spaced along their supporting shafts so that the beater bars on all four shafts lie in parallel planes. Between the upper and lower shafts, and in the spaces defined by these parallel planes, the casing 8 is provided with a series of parallel heater members 24. Each of the members 24 is supported by angle irons 25, suitably secured to opposite edges of the members 24 and to the side walls 10 and 11 of the casing 8.

Any suitable construction of the heating members 24 can be used, providing it presents a comparatively smooth surface to the cotton and air passing through the casing, so that the cotton fibers will not collect thereon. In the form shown in Figures 1 to 5 of the drawings, each member comprises two substantially rectangular plates 26 and 27 which are turned inwardly at their edges and welded together to form a steam-tight structure having a large surface area with a minimum thickness. The plates 26 and 27 are cupped inwardly toward each other at spaced intervals; and these cupped parts are secured to each other by rivets 28, or in any other suitable manner to prevent rupture by the internal pressure of the heating fluid.

An alternative form of heating member is illustrated in Figures 6 and 7. In this form the member 29 comprises a pair of headers 30 and 31 which may be suitably secured to the side walls 10 and 11 of the casing. The headers 30 and 31 are connected to each other by a series of oval pipes 32 arranged in edged contact with each other. The essential thing in the construction of these heating elements is to avoid sharp angles between the several parts, so as to avoid the collection of cotton fibers during the passage of the cotton through the drier casing.

The lower part of the casing 8 is provided with a pair of arcuate screens 33 and 34 extending from the side walls 10 and 11 to a central partition 35. The screens 33 and 34 are concentric with the axis of the shafts 20 and 21, and are used to separate the dirt from the cotton during its passage through the drier casing. The partition 35 is cut away as indicated at 36 to permit free exit of the cotton and air through the outlet pipe 37 which connects the cleaner-drier to the separator S of the ginning outfit G.

The inlet pipe 38 of the cleaner-drier may be connected to the usual telescope 39 adapted to draw seed cotton from a truck or other source of supply. The movement of the cotton from the source of supply through the cleaner-drier to the separator S of the gin outfit is effected by the suction fan F of the outfit. The movement by suction through the cleaner-drier is augmented and supplemented by the action of the beater arms in the cleaner-drier.

In the operation of the cleaner-drier, the current of air entering the inlet 38 does not pass immediately to the bottom of the casing, but is distributed along the top and passed downwardly between the heating members 24 more or less uniformly. In passing between the heating members, the air absorbs the necessary heat to effect the drying of the cotton. The rapid rotation of the beater arms causes the air to come into intimate contact with the surfaces of the heating member. The upper rows of beater arms also serve to knock off any loose cotton which might otherwise accumulate on the top edges of the heating members.

It will be obvious that the lower rows of beater arms throw the cotton upwardly into the descending current of hot air so as to dry the cotton thoroughly and uniformly. It will also be obvious that the total distance which the air travels from the inlet to the outlet of the cleaner-drier, is the same regardless of the path that it takes between any two of the heating members. When the air reaches the bottom of the heating members at any point, it has obtained its maximum temperature. Therefore, the air and cotton leave the cleaner-drier at the maximum temperature and go immediately to the separator S, where the air, with the absorbed moisture, is separated from the cotton.

The maximum temperature of the air in the cleaner-drier may be regulated to suit the moisture in the cotton, either by varying the steam pressure in the heating element, or by using valves (not shown) to cut off the supply of steam from one or more of the heating elements.

Numerous variations may doubtless be devised by persons skilled in the art without departing from the principles of my invention. I, therefore, desire no limitations to be imposed on my invention, except such as are indicated in the appended claims.

What I claim is:

1. A cotton gin outfit including a separator and means for drawing air through the separator, a cotton drier and cleaner having an outlet connected to said separator and an inlet adapted to be connected to a source of seed cotton supply, said cotton drier comprising: a substantially rectangular casing, a series of substantially parallel heating members vertically arranged in said casting, means for regulating the temperature of said heating members, and mechanically operated means in said casing supplementing said air drawing means for forcing the seed cotton from said inlet through said casing and in contact with said heating members through said outlet into said separator.

2. A cotton gin outfit including a separator and means for drawing air through the separator, a cotton drier and cleaner having an outlet connected to said separator and an inlet adapted to be connected to a source of seed cotton supply, said cotton drier comprising: a substantially rectangular casing, a series of substantially parallel heating members vertically arranged in said casing, means for regulating the temperature of said heating members, and means in said casing supplementing said air drawing means for moving the cotton spirally through said casing and in contact with said heating members from the said inlet and through said outlet into said separator.

3. A cotton gin outfit including a separator and means for drawing air through the separator, a cotton drier and cleaner having an outlet connected to said separator and an inlet adapted to be connected to a source of seed cotton supply, said cotton drier comprising: a substantially rectangular casing, a series of substantially parallel heating members vertically arranged in said casing, means for regulating the temperature of said heating members, mechanically operated means in said casing supplementing said air drawing means for forcing the seed cotton from said inlet and in contact with said heating members through said casing and outlet into said separator, and means in the bottom of said casing for separating dirt and trash from the cotton during its movement through said drier.

4. A cotton cleaner-drier comprising a substantially rectangular closed casing, having an inlet on the top thereof near one of its ends and an outlet at the lower part of the other end, parallel beaters journaled in the ends of said casing and rotatable in opposite directions to force cotton through said casing from the inlet to the outlet thereof, and a series of heater members suitably secured to opposite sides of said casing and arranged substantially vertically in the spaces between said beaters.

5. A cotton cleaner-drier comprising a substantially rectangular closed casing having an inlet near the upper part of one end thereof and an outlet near the lower part of the other end, beaters journaled in said ends to rotate about substantially parallel axes to force cotton through said casing from the inlet to the outlet thereof, heating members supported in substantially parallel vertical planes in said casing and in the paths of movement of said cotton, and screens forming the bottom of said casing to separate dirt and trash from the cotton moving therethrough.

6. A cotton cleaner-drier comprising a substantially rectangular closed casing having an inlet near the upper part of one end thereof and an outlet near the lower part of the other end, two pairs of shafts journaled in the ends of said casing, one pair of shafts lying in a substantially horizontal plane and the other pair of shafts lying in a plane parallel thereto and in vertical planes passing through the axes of the first named pair, beater blades spaced apart along each of said shafts and lying in substantially parallel vertical planes, heater members mounted on the opposite sides of said casing and extending in substantially parallel vertical planes between the vertical planes of said beater members, arcuate screens mounted in said casing and concentric with the axes of the lower pair of shafts, and hoppers below said screens for removing dirt and trash separated from the cotton during its passage through said casing.

7. A cotton gin outfit including a separator, a fixed conduit adapted to be connected to a source of cotton supply, means for drawing air through said conduit and separator, and means in said conduit for simultaneously heating the air and cotton drawn therethrough directly to said gin outfit.

8. A cotton gin outfit including a separator, a fixed conduit adapted to be connected to a source of cotton supply, means for drawing air through said conduit and separator, means in said conduit for heating the air and cotton drawn therethrough, and auxiliary mechanism for propelling the cotton through said conduit and moving the cotton into intimate contact with said heating means to effect the drying of the cotton.

NELSON B. HENRY.